US011760851B2

(12) United States Patent
Chen et al.

(10) Patent No.: US 11,760,851 B2
(45) Date of Patent: Sep. 19, 2023

(54) CAST FILM COMPONENT LAYER EXHIBITING AN OUTSTANDING CLING PROPERTY

(71) Applicant: Formosa Plastics Corporation, USA, Livingston, NJ (US)

(72) Inventors: Chih-Jian Chen, Port Lavaca, TX (US); Honglan Lu, Port Lavaca, TX (US); Guangxue Xu, Port Lavaca, TX (US); Ming-Yung Lee, Port Lavaca, TX (US); Raj Ranjan, Victoria, TX (US)

(73) Assignee: Formosa Plastics Corporation, U.S.A., Livingston, NJ (US)

( * ) Notice: Subject to any disclaimer, the term of this patent is extended or adjusted under 35 U.S.C. 154(b) by 0 days.

(21) Appl. No.: 14/319,999

(22) Filed: Jun. 30, 2014

(65) Prior Publication Data

US 2015/0376354 A1    Dec. 31, 2015

(51) Int. Cl.
*C08J 5/18* (2006.01)
*B32B 27/32* (2006.01)
(Continued)

(52) U.S. Cl.
CPC .................. *C08J 5/18* (2013.01); *B32B 27/08* (2013.01); *B32B 27/18* (2013.01); *B32B 27/32* (2013.01); *B32B 27/327* (2013.01); *B32B 2250/24* (2013.01); *B32B 2250/242* (2013.01); *B32B 2307/30* (2013.01); *B32B 2307/54* (2013.01); *B32B 2307/581* (2013.01); *B32B 2307/5825* (2013.01); *B32B 2307/72* (2013.01); *B32B 2307/732* (2013.01); *B32B 2307/736* (2013.01); *B32B 2439/00* (2013.01); (Continued)

(58) Field of Classification Search
None
See application file for complete search history.

(56) References Cited

U.S. PATENT DOCUMENTS 4,438,238 A    3/1984    Fukushima et al.
4,588,650 A    5/1986    Mientus et al.
(Continued)

FOREIGN PATENT DOCUMENTS

WO    WO 89/10944    * 11/1989
WO    9003414 A1    4/1990
(Continued)

OTHER PUBLICATIONS

PCT Application No. US2015/37165; International Search Report and Written Opinion of the International Searching Authority for Applicant Formosa Plastics Corporation, USA dated Sep. 16, 2015.

*Primary Examiner* — Ronak C Patel
(74) *Attorney, Agent, or Firm* — Jones Walker LLP

(57) ABSTRACT

A cast film, for use in monolayer and multilayer applications, having an outstanding inherent cling property is disclosed. Additionally, a multilayer cast film utilizing a cast film component layer prepared from a Ziegler-Natta catalyzed ethylene and alpha-olefin copolymer is disclosed, wherein the cast film component layer has a cling force of at least 200 grams-force per inch width at 200% pre-stretch, a slow puncture resistance of greater than 50 J/mm, and a TD tear strength of greater than 450 g/mil, with no cling additives present in the cast film component layer.

6 Claims, 2 Drawing Sheets

(51) Int. Cl.
*B32B 27/08* (2006.01)
*B32B 27/18* (2006.01)

(52) U.S. Cl.
CPC ....... *B32B 2439/40* (2013.01); *B32B 2439/70* (2013.01); *B32B 2553/00* (2013.01); *C08J 2323/08* (2013.01)

(56) References Cited

U.S. PATENT DOCUMENTS

| | | |
|---|---|---|
| 4,612,300 A | 9/1986 | Coleman, III |
| 4,935,474 A | 6/1990 | Ewen et al. |
| 4,937,299 A | 6/1990 | Ewen et al. |
| 5,112,674 A | 5/1992 | German et al. |
| 5,114,763 A | 5/1992 | Brant et al. |
| 5,141,809 A | 8/1992 | Arvedson et al. |
| 5,154,981 A | 10/1992 | Brant et al. |
| 5,173,343 A | 12/1992 | Arvedson et al. |
| 5,175,049 A | 12/1992 | Huff et al. |
| 5,212,001 A | 5/1993 | Brant et al. |
| 5,273,809 A | 12/1993 | Simmons |
| 5,419,934 A | 5/1995 | Wilson |
| 5,516,475 A | 5/1996 | Wilson |
| 5,538,790 A * | 7/1996 | Arvedson ............... B32B 27/32 264/176.1 |
| 5,569,693 A | 10/1996 | Doshi et al. |
| 5,617,707 A | 4/1997 | Simmons |
| 5,998,017 A | 12/1999 | Eichbauer |
| 6,172,173 B1 | 1/2001 | Spencer et al. |
| 6,265,055 B1 | 7/2001 | Simpson et al. |
| 6,355,359 B1 | 3/2002 | Sukhadia et al. |
| 6,713,189 B2 | 3/2004 | Ho et al. |
| 6,992,034 B2 | 1/2006 | Xu et al. |
| 7,611,768 B2 | 11/2009 | Tukachinsky |
| 7,618,913 B2 | 11/2009 | Xu et al. |
| 7,655,317 B2 | 2/2010 | Brant et al. |
| 7,754,341 B2 | 7/2010 | Liang et al. |
| 8,318,864 B2 | 11/2012 | Harris et al. |
| 8,722,804 B2 | 5/2014 | Lue et al. |
| 2003/0114595 A1 | 6/2003 | Van Dun et al. |
| 2003/0130464 A1 * | 7/2003 | Ho ............................ C08J 5/18 526/348.2 |
| 2003/0130108 A1 | 10/2003 | Jaber |
| 2004/0072005 A1 * | 4/2004 | German ................ B32B 27/322 428/523 |
| 2004/0157726 A1 | 8/2004 | Kong et al. |
| 2005/0087914 A1 | 4/2005 | Rhee et al. |
| 2007/0260016 A1 * | 11/2007 | Best ........................ B32B 27/32 525/240 |
| 2009/0104424 A1 | 4/2009 | Manrique et al. |
| 2010/0298500 A1 * | 11/2010 | Lee ........................... B32B 7/12 525/207 |
| 2012/0053305 A1 * | 3/2012 | Mavridis ............... C08F 210/16 526/86 |
| 2012/0219776 A1 | 8/2012 | Vignola et al. |
| 2012/0219814 A1 | 8/2012 | Vignola et al. |
| 2013/0164552 A1 * | 6/2013 | Wang .................. C08L 23/0815 428/523 |
| 2013/0253150 A1 * | 9/2013 | Lu ........................ C08F 4/6055 526/90 |
| 2014/0147646 A1 | 5/2014 | Chen et al. |

FOREIGN PATENT DOCUMENTS

| | | |
|---|---|---|
| WO | 2013181085 A1 | 12/2013 |
| WO | 2014012250 A1 | 1/2014 |

* cited by examiner

CAST FILM COMPONENT LAYER EXHIBITING AN OUTSTANDING CLING PROPERTY

BACKGROUND

The present invention relates to a cast film component layer and more particularly to a stretch cast film component layer made from LLDPE of inherently outstanding cling property.

Stretch cast films are widely used in a variety of bundling and packing applications, for example, bundling goods for shipping and storage. Stretch cast films having high cling properties are particularly useful because the high cling helps prevent unraveling of the film from bundled goods.

To improve the cling performance of a stretch cast film, a number of approaches have been developed, including the use of tackifying additives or "tackifiers." Such tackifiers include polybutenes, polyisobutylenes (PIB), polyterpenes, amorphous polypropylene, ethylene-propylene rubber, polyethylene elastomers, ethylene vinyl acetate copolymers, microcrystalline wax, alikali metal sulfosuccinates, and mono- and di-glycerides of fatty acids. The use of such additives are disclosed in U.S. Pat. Nos. 5,569,693; 5,212,001; 5,175,049; 5,173,343; 5,154,981; 5,141,809; 5,114,763; 5,112,674; 5,538,790; and 7,655,317. Unfortunately, the use of tackifiers typically add to the cost of the final products, requires either pre-blending or alternation to production equipment to incorporate, and requires aging to bloom to the surface, all of which are negative aspects of its use.

For multilayer stretch cling film applications, it is typically required that at least one outer layer have a cling characteristic allowing it to adhere to an adjacent wrapping film when applied to a bundled load. Some of the requirements for such composition are disclosed in U.S. Pat. Nos. 7,611,768; 6,265,055; 5,998,017; and 5,419,934; U.S. Published Patent Application Nos. 2003/0114595 A1; 2009/0104424 A1; and 2014/0147646 A1; and PCT Publication Nos. WO 2014/012,250 and WO 2013/181,085. The use of LLDPE containing high n-hexane extractables (i.e. about >3.5% by weight, for example) in the outermost layers for cling was disclosed in U.S. Pat. Nos. 5,617,707; 5,516,475; and 5,273,809. Concerns over having high hexane extractables containing LLDPE in the outermost layer exist because the high hexane extractables are believed to contribute to the problem of die lip build up during extrusion and a buildup of low molecular weight olefinic material on fabrication equipment. Another concern with high hexane extractables is they tend to cause blocking of the film on the wound roll. One indicator of a blocked roll is high unwind noise. Severe blocking can cause the film to tear off the braked roll during unwinding.

In addition to cling property, there are certain mechanical properties that are important in stretch cast films, including film stretch ability, film tensile strength, film puncture resistance and film tear resistance. Descriptions of such important mechanical properties are disclosed in U.S. Pat. Nos. 8,722,804; 7,754,341; 6,713,189; and U.S. Published Patent Application No. 2012/0219814 A1.

As such, there is a need for a unique LLDPE-based cast film composition for mono- and multilayer applications that inherently exhibit an outstanding cling property, low hexane extractables, low unwind force, and balanced mechanical properties such as high puncture resistance and tear strength.

SUMMARY OF THE INVENTION

The present invention provides a cast film component layer that can be used in monolayer as well as multilayer applications. For multilayer applications, the cast film component layer of present invention, due to its high inherent cling performance, can be used effectively as skin layers. It is also within the scope of present invention to prepare a multilayer film having at least one or more layers prepared from different plastic resins such as polypropylene (PP), ethylene propylene copolymers, low density polyethylene (LDPE), medium density polyethylene (MDPE), high density polyethylene (HDPE), metallocene-catalyzed polyethylene (mPE), very low density polyethylene (VLDPE), and/or ultralow density polyethylene (ULDPE).

In a preferred embodiment, a cast film component layer having an outstanding inherent cling property is disclosed. Additionally, a multilayer cast film utilizing a cast film component layer prepared from a Ziegler-Natta catalyzed ethylene and alpha-olefin copolymer is disclosed, wherein the cast film component layer has a cling force of at least 200 grams-force per inch width at 200% pre-stretch, a slow puncture resistance of greater than 50 J/mm, and a TD tear strength of greater than 450 g/mil, with no cling additives present in the cast film component layer.

In another embodiment, a cast film component layer for use in monolayer and multilayer applications is prepared from a Ziegler-Natta catalyzed ethylene and alpha-olefin copolymer having a density between about 0.910 g/cc and about 0.930 g/cc, a hexane extractables of less than about 3.5 wt %, a melt index ratio ($I_2O_2$) of between about 20 and about 35 dg/min, a melt index ($I_2$) of between about 0.5 and about 10 dg/min, a polydispersity index (Mw/Mn) of between about 3.0 and about 5.0, and at least 15% of Temperature Raising Elusion Fraction (TREF) fraction below an elution temperature of 35° C. The cast film component layer has a cling force of at least 200 grams-force per inch width at 200% pre-stretch and a slow puncture resistance of greater than 50 J/mm. The copolymer is produced by reacting ethylene and an alpha-olefin comonomer in the presence of titanium-based Ziegler-Natta catalyst in a gas phase reactor process at reaction temperature in the range of about 50° C. to about 100° C. Importantly, no cling additives are present in the cast film component layer disclosed herein.

DETAILED DESCRIPTION

Figure 1:
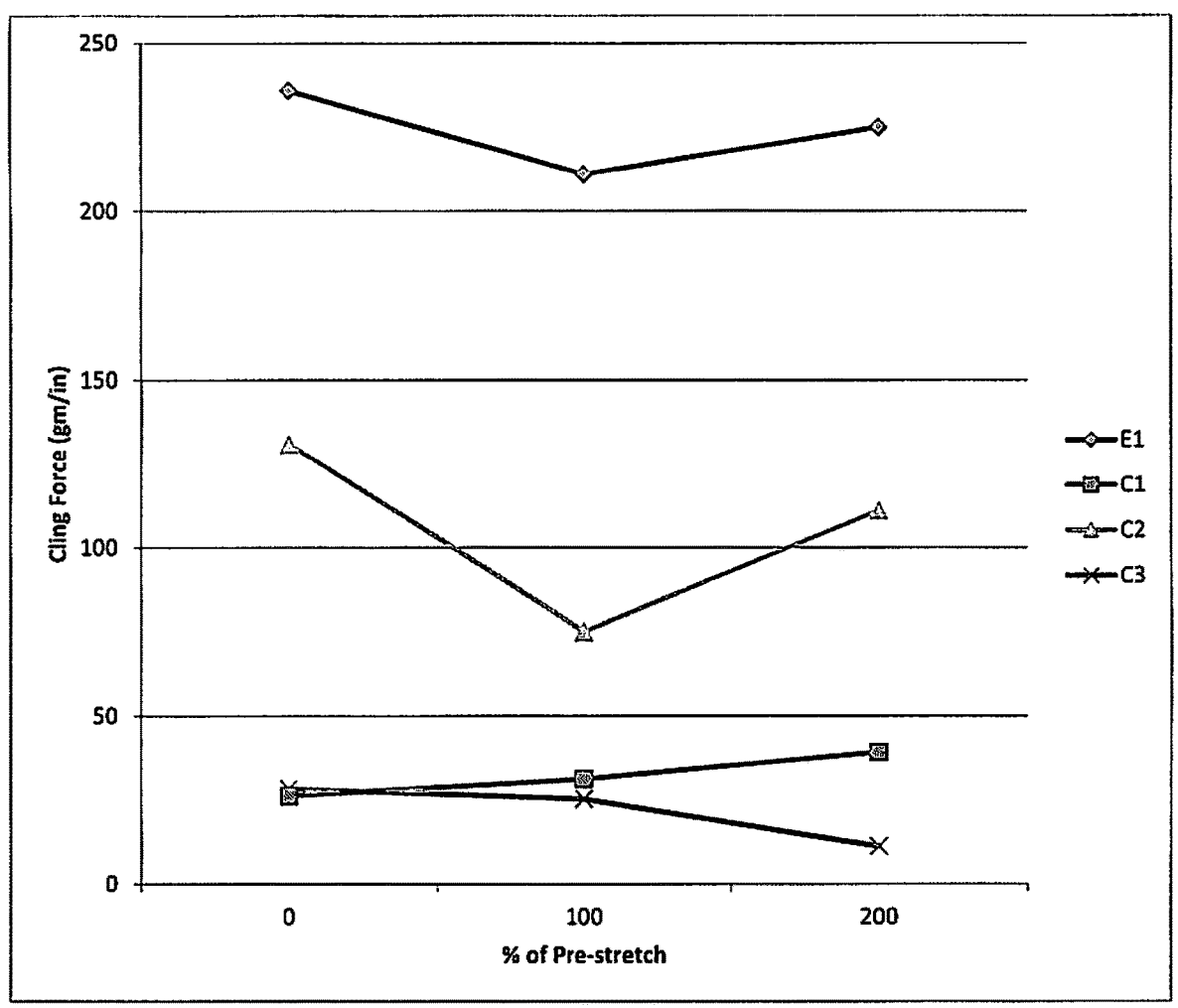
FIG. 1 presents the cling force (grams-force per inch width) at given % of pre-stretch of Example 1 (E1) and that of commercial 1-Octene ZN LLDPE (C1); 1-Hexene ZN LLDPE (C2); and 1-Hexene metallocene-LLDPE (C3).
Figure 2:
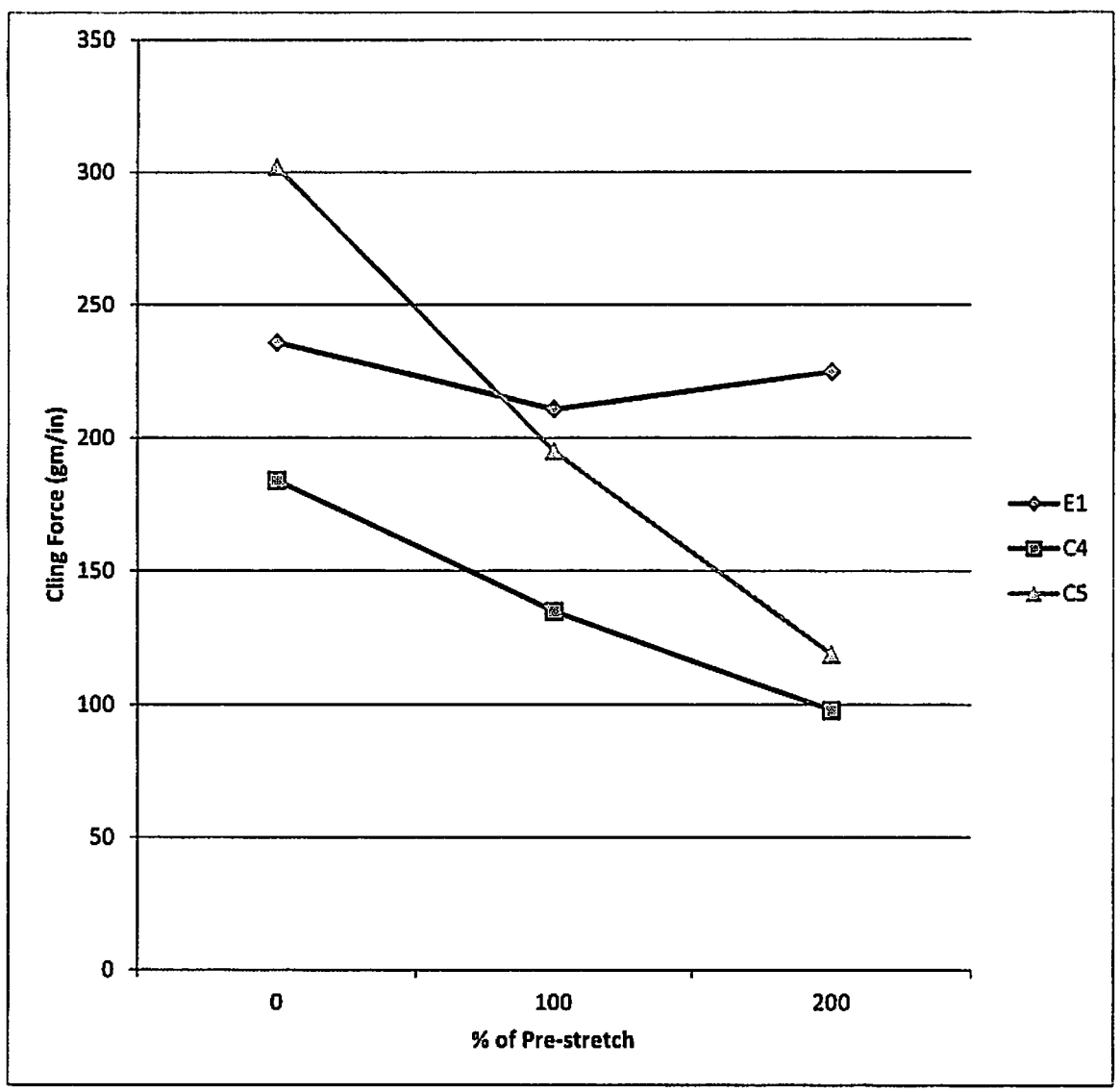
FIG. 2 presents the cling force (grams-force per inch width) at given % of pre-stretch of Example 1 (E1) and that of commercial 1-Hexene metallocene LLDPE (C3) treated with Vistamaxx™: 5% (C4); and Vistamaxx™: 10% (C5).

The present invention relates to the production of advanced Ziegler-Natta catalyzed LLDPE as a cast film component layer with a novel composition distribution. The LLDPE resins used in the present invention are preferably prepared using this advanced Ziegler-Natta catalyst in a gas-phase fluidized bed reactor. These resins of the present invention provide a stretch cast film component layer that can be used in monolayer as well as multilayer applications with desirable performance with no external cling agent.

Catalyst Components and Catalyst Systems

The catalyst utilized herein is an advanced Ziegler-Natta catalyst modified with non-single-site catalyst ligands and/ or interior with a strong Lewis base such as aromatic compounds containing a nitrogen atom. Examples of such catalyst are described in U.S. Pat. Nos. 6,992,034 and 7,618,913, which are incorporated by reference herein.

Polymerization/Copolymerization Process and Polymer Products

Ethylene and other alpha-olefins may be copolymerized with the catalyst systems prepared according to aspects of the present invention by any suitable process. Suitable polymerization processes include slurry phase, solution, gas phase and a high pressure process, or any combination thereof. A desirable process is a gas phase polymerization of one or more one or more olefin monomers having from 2 to 30 carbon atoms, more preferably from 2 to 12 carbon atoms, and most preferably from 2 to 8 carbon atoms. The ethylene copolymers prepared in accordance with the present invention may be copolymers of ethylene with one or more $C_3$-$C_{10}$ alpha-olefins. Thus, copolymers having two types of monomeric units are possible as well as terpolymers having three types of monomeric units. The preferred co-monomers include 4-methyl-1-pentene, 1-hexene, 1-octene and 1-butene for the catalyst prepared according to the present invention. Particular examples of such copolymers include, for example, ethylene/1-butene copolymers, ethylene/1-hexene copolymers, ethylene/1-octene copolymers, ethylene/4-methyl-1-pentene copolymers, ethylene/1-butene/1-hexene terpolymers, ethylene/propylene/1-hexene terpolymers and ethylene/propylene/1-butene terpolymers.

There are no particular restrictions on the polymerization conditions for production of polyolefins according to the present invention, such as the polymerization temperature, polymerization time, polymerization pressure, monomer concentration, etc., but typically the polymerization temperature is about –100° C. to about 300° C., the polymerization time is about 10 seconds to about 20 hours and the polymerization pressure is typically from normal pressure to about 350 psia. Hydrogen or the like may be used to adjust the molecular weight during polymerization. The polymerization may be carried out in a batch system, semi-continuous system or continuous system, and it may be carried out in one or more stages under different polymerization conditions. The polyolefins may be directly obtained from gas phase process, or obtained by isolation and recovery of solvent from the slurry or solution process.

Typically in a gas phase polymerization process a continuous cycle is employed wherein one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers in continuously cycled through a fluidized bed in the presence of a catalyst or prepolymer under reactive conditions. The gaseous stream is withdrawn from the fluidized bed and recycled back into the reactor. Simultaneously, polymer product is withdrawn from the reactor and fresh monomer is added to replace the polymerized monomer.

The ethylene partial pressure should vary between 10 and 250 psia, preferably between 65 and 150 psia, more preferably between 75 and 140 psia, and most preferably between 90 and 120 psia. More importantly, a ratio of comonomer to ethylene in the gas phase should vary from 0.0 to 0.50, preferably between 0.005 and 0.25, more preferably between 0.05 and 0.20, and most preferably between 0.10 and 0.15. Reactor pressure typically varies from 100 psig to 500 psig. In one aspect, the reactor pressure is maintained within the range of from 200 psig to 500 psig. In another aspect, the reactor pressure is maintained within the range of from 250 psig to 350 psig.

The catalysts prepared according to the invention are particularly useful for the production of copolymers. Such copolymer resins may have a density of 0.958 g/cc or less, preferably 0.952 g/cc or less, or even 0.940 g/cc or less. In accordance with certain aspects of the present invention, it is possible to achieve densities of less than 0.910 g/cc and even as low as 0.870 g/cc. Copolymer resins produced in accordance with the present invention preferably contain at least about 75 percent by weight of ethylene units. Most preferably, the copolymer resins of the invention contain at least 0.5 weight percent, for example from 0.5 to 25 weight percent of an alpha-olefin.

The molecular weight of the copolymers may be controlled in a known manner, preferably by using hydrogen. With the catalysts produced according to the present invention, molecular weight may be suitably controlled with hydrogen when the polymerization is carried out at temperatures from about 20° C. to about 300° C. This control of molecular weight may be evidenced by a measurable positive change of the melting index ($I_2$).

The molecular weight distribution (MWD) of the polymers prepared in the presence of the catalysts of the present invention, as expressed by the MFR values, varies from about 10 to about 40. MFR is the ratio of the high-load melt index (HLMI or $I_{21}$) to the melt index (MI or $I_2$) for a given resin (MFR=$I_{21}/I_2$). The ethylene/1-hexene copolymer having a density of 0.910 g/cc to 0.930 g/cc, in a preferred embodiment, have a melt index ratio ($I_{21}/I_2$) of from greater than about 20 to less than about 30.

The polymers have a molecular weight distribution, a weight average molecular weight to number average molecular weight ($M_w/M_n$) of greater than 2.5 to about 8.0, particularly greater than 2.5 to about 4.5, more preferably greater than about 3.0 to less than about 4.0, and most preferably greater than about 3.2 to 3.8. The polymers have a ratio (Mz/Mw) of z-average molecular weight (Mz) to weight average molecular weight of greater than 2.5 or greater than 3.5. In one embodiment, this ratio is from about 2.5 and 3.8. In yet another embodiment, this ratio is from about 2.5 to about 3.5. In still yet another embodiment, this ratio is from about 2.5 to about 3.0. The ratio of z-average molecular weight to weight average molecular weight (Mz/Mw) reflects the inter- and/or intro-macromolecular entanglement and unique polymer rheology behavior.

All parts, proportions, and percentages are by weight unless otherwise indicated. All examples below were carried out in dry, oxygen-free environments and solvents. Ti, Si, and Mg content in the solid catalyst component were determined by ICP emission analysis method. Melt flow index (MI) of polymer was measured at 190° C., according to ASTM D1238. Melt flow ratio (MFR), which is the ratio of high melt flow index (HLMI or $I_{21}$) to melt index (MI or $I_2$), was used as a measure of melt fluidity and a measure of the molecular weight distribution of polymer. The melt flow ratio is believed to be an indication of the molecular weight distribution of the polymer, the higher the value, the broader the molecular weight distribution. Density was measured according to ASTM D 1505-98.

All molecular weights are weight average molecular weight unless otherwise noted. Molecular weights (weight average molecular weight ($M_w$) and number average molecular weight ($M_n$) and ($M_z$) were measured by Gel Permeation Chromatography (GPC). The melting point of polymers was measured by DSC.

Composition distribution or short chain branching distribution of polymers, and comonomer content and molecular weight in each fractionated fraction were determined by TREF and GPC-FTIR at a high temperature of 145° C., flow rate of 0.9 mL/min, solvent of TCB, and the concentration of solution of 2.5 mg/mL.

Composition Distribution

The composition distribution of an ethylene alpha-olefin copolymer refers to the distribution of comonomers among the molecules (short chain branches distribution) that comprise the polyethylene polymers. As noted in prior art, conventional Ziegler-Natta catalysts (ZN), owning to their multiple active sites nature, typically produce resins having both broad molecular weight distribution and broad composition distribution. These conventional Ziegler-Natta resins are further characterized by comonomers incorporated predominantly in the low molecular weight chains. Therefore, resins made with conventional Ziegler-Natta type catalysts have good processability, high stiffness and tear strength, but weak film toughness properties (e.g. dart impact and puncture properties). Some examples are shown in U.S. Pat. Nos. 4,438,238; 4,612,300; 6,172,173, 6,713, 189; and 6,355,359.

Certain metallocene catalysts are capable of producing resins with narrow composition distribution in which the comonomer contents is about uniform among the polymer chains of different molecular weight. These metallocene based narrow composition distribution resins are further characterized by very narrow molecular weight distribution. Both short chain branch distribution and polymer chain distribution are homogeneous due to that comonomers are uniformly distributed among polymers of different molecular weight. These mLLDPEs, having both narrow composition distribution and narrow molecular weight distribution, are known to produce tough films with high dart impact and puncture properties but "poor" processability, low stiffness and tear strength. Some examples are shown in U.S. Pat. Nos. 4,937,299; 4,935,474; and PCT publication WO 90/03414.

The distribution of the short chain branches can be measured, for example, using Temperature Raising Elution Fractionation (TREF) in connection with a Light Scattering (LS) detector in GPC to determine the weight average molecular weight of the molecules eluted from the TREF. The combination of TREF and GPC-LS and FTIR yields information about the breadth of the composition distribution and whether the comonomer contents increases, decreases, or is uniform across the chains of different molecular weights.

The Ziegler-Natta catalyst used in the present invention was found capable of producing resins of the present invention to exhibit a novel composition distribution in which commoners are incorporated into the high molecular weight polymer molecules and distributed substantially evenly among the entire polyethylene chains with substantial absence of low molecular weight polymer molecules The resins of the present invention exhibit a controlled molecular weight distribution which is narrower than conventional ZN catalyzed copolymers but broader than metallocene catalyzed copolymers. The resins of the present invention exhibit a unique Temperature Raising Elusion Fraction (TREF) fraction distribution of the copolymer, having at least 15% of TREF fraction below an elusion temperature of 35° C. Detailed description of the novel compositional distribution of the resins of the present invention is described in U.S. Publ. App. 2013/0253150 A1, which is incorporated in its entirety by reference herein.

Cast Film Extrusion and Properties

The resins/polymers to manufacture the cast film component layer of the present invention are preferably prepared using the advanced Ziegler-Natta catalysts with the novel capabilities described above and methods for their preparation as disclosed in U.S. Pat. Nos. 6,992,034 and 7,618,913, which is incorporated in its entirety by reference herein.

The polymers produced according to the teachings of the present invention are more easily extruded into film products by cast film processing techniques as compared to commercial 1-octene LLDPE (Comparative Example, C1), commercial Super-hexene (Comparative Example, C2), and commercial mLLDPE (Comparative Example, C3) of comparable melt index and density. The resins in the present invention have, for a given MI, a MWD narrower than hexene copolymer resins but broader than mLLDPEs. The resins of this invention also exhibit a molecular structure such as co-monomer distribution very similar to typical mLLDPE resins.

A Davis-Standard Cast Film Line was used to evaluate the film extrusion processability of LLDPE of the cast film component layer of the present invention against the leading industrial grade LLDPE products: i.e., C1, C2 and C3. The Cast Line included a 1.25 mm 24:1 length/diameter (L/D) KL125 Killion extruder and a general purpose screw, and a 12" wide die and roller train. The Die gap was set at 30 mils. The cast roll stack is composed of two individually temperature controlled rollers in an S-wrap configuration. The cast sheet from the die contacts the top S-wrap roller. An air knife pins the sheet to the roller. The melt curtain is roughly 1 inch. Drawdown to film is achieved by adjusting the speed of the cast roll stack. For the cast sheet only, a calendaring roller presses against the cast sheet on the top s-wrap roller. This roller was disengaged for the film. The film exiting the cast roll stack is fed to the master-drive nip roller and thereon to a torque controlled winder. A slight positive speed gradient is maintained between the nip and the cast roll stack to remove any slackness in the film.

The film was manually collected at the nip roller exit. It was laid smoothly on top of a 5 mil Kraft paper on the work table. A second layer of Kraft paper was laid on the film. A 6 ft long paper/film/paper sandwich was created. Film strips for cling tests were retrieved from this sandwich. The paper provided an elastic foundation which imparted stiffness during cutting. Several sandwich stacks can be mounted on top of one another to cut multiple samples.

The cast film component layer of the present invention can have an initial or first cling force value at 0% pre-stretch of about 200 to 280 grams-force per inch width. Cling force was measured according to ASTM D 5458 using a Test Resources Cling tester fitted to an Instron 3365 Universal Tensile Tester. The ASTM D5458 test method was modified by using a freshly pre-stretched inclined plane film sample with each replicate. Both film samples were pressed together by rolling a heavy roller prior to the test. Cling strength was measured at 0%, 100%, and 200% pre-stretch characteristic of hand wrap and machine wrap applications. Only the bottom (platform) testing strip is stretched to the desired percent stretch.

Slow puncture tests were run in accordance to ASTM D 5748. The puncture test uses a 0.75 in. diameter pear shaped Teflon coated probe with an Instron 3365 Universal Tensile Tester. Probe descent speed is 508 mm/min. The exposed film sample is 4 in diameter clamped in a 6 in by 6 in clamp. To reduce slippage, fine grit sandpaper is inserted between the metal clampp and the film. Slow puncture data is stated as energy at break normalized to film thickness, j/mm Tensile measurements were made according to ASTM D882.

Film Elmendorf Tear (g/mil) was made according to ASTM D 1922.

EXAMPLES

In order to provide a better understanding of the foregoing discussion, the following non-limiting examples are offered. Although the examples may be directed to specific embodiments, they are not to be viewed as limiting the invention in any specific respect.

Polymerization

The ethylene/1-hexene copolymers from Examples 1 and 2 (E1 and E2) listed in Tables 1 to 3 were produced in accordance with the following general procedure. Polymerization was conducted in a gas-phase fluidized bed reactor operating at approximately 300 psig total pressure. Fluidizing gas was passed through the bed at a velocity of approximately 1.8 feet per second. The fluidizing gas exiting the bed entered a resin disengaging zone located at the upper portion of the reactor. The fluidizing gas then entered a recycle loop and passed through a cycle gas compressor and water-cooled heat exchanger. The shell side water temperature was adjusted to maintain the reaction temperature to the specified value in the range of from 175° F. to 195° F. Ethylene, hydrogen, 1-hexene and nitrogen were fed to the cycle gas loop just upstream of the compressor at quantities sufficient to maintain the desired gas composition. Gas compositions were measured by an on-line GC analyzer. The catalyst in the form of prepolymer was injected to the reactor bed through a stainless steel injection tube at a rate sufficient to maintain the desired polymer production rate. Nitrogen gas was used to disperse the catalyst into the reactor. Product was withdrawn from the reactor, polymer was collected after discharging and degassing in the downstream, gases were recycled in the loops and residual catalyst and co-catalyst in the resin was deactivated with a wet nitrogen purge. Final powder product (polymer) was transferred into extrusion and pelletized into granular product. The hexane extractable of Example 1 (E1) and Example 2 (E2) were 2.8 and 2.5, respectively.

Polymer Properties and Case Film Properties

The resulting polymers characterized by DSC and GPC were extruded using Davis-Standard Cast Film Line. The film process conditions in Davis-Standard Cast Film pilot is shown in Table 1.

Comparative Example C1 is a commercial octene-copolymer. Comparative Example C2 is a commercial hexene-copolymer Z/N LLDPE; and Comparative Example C3 is a hexene-copolymer metallocene-LLDPE. Comparative Example C4 is a commercial hexene-copolymer metallocene-LLDPE(C3) treated with 5% external cling agent Vistamaxx™ 6102 FL. Comparative Example C5 is commercial hexene-copolymer metallocene-LLDPE (C3) treated with 10% external cling agent Vistamaxx™ 6102 FL. The polymer and cast film properties are shown in Tables 2-3.

TABLE 2

Cast film properties

| | E1 | E2 | C1 | C2 | C3 |
|---|---|---|---|---|---|
| MI | 2.16 | 1.98 | 2.3 | 3.2 | 3.5 |
| Density, g/cc | 0.918 | 0.917 | 0.917 | 0.918 | 0.918 |
| MD Tensile Break, MPa | 44 | 49 | 40 | 41 | 38 |
| TD Tensile Break, MPa | 29 | 29 | 33 | 23 | 35 |
| MD Break Elongation, % | 474 | 562 | 514 | 492 | 620 |
| TD Break Elongation, % | 843 | 812 | 840 | 815 | 715 |
| MD Yield stress, MPa | 10 | 10 | 8 | 10 | 8 |
| TD Yield stress, Mpa | 10 | 9 | 8 | 8 | 7 |
| MD Yield Elongation, % | 15 | 13 | 18 | 15 | 15 |
| TD Yield Elongation, % | 11 | 11 | 12 | 11 | 11 |
| MD Tear, g/mil | 101 | 148 | 373 | 201 | 211 |
| TD Tear, g/mil | 465 | 477 | 461 | 633 | 299 |
| Puncture, low strain rate (@508 mm/min) | | | | | |
| Energy at Break, J/mm | 59 | 74 | 51 | 46 | 61 |
| Cling Force, gm/in (0% pre-stretch) | 236 | 260 | 26 | 131 | 28 |
| Cling Force, gm/in (100% pre-stretch) | 211 | 212 | 31 | 75 | 25 |
| Cling Force, gm/in (200% pre-stretch) | 225 | 318 | 39 | 111 | 11 |

As shown in Table 2, the TD tear strength of Examples 1 and 2 (E1 and E2) which were manufactured from an advanced Ziegler-Natta catalyst according to the present invention are comparable to commercial octene-copolymer (C1) and much stronger than commercial hexene-copolymer metallocene-LLDPE (C3). The puncture property of E1 and E2 is better than commercial octene-copolymer (C1) and commercial hexene-copolymer Z/N LLDPE (C2) and comparable to commercial hexene-copolymer metallocene-LLDPE (C3).

The cling force of Examples 1 and 2 (E1 and E2) under 0% pre-stretch is over 200 gram, which is much higher than

TABLE 1

Cast film condition

| Samples | | E1 | E2 | C1 | C2 | C3 | C4 | C5 |
|---|---|---|---|---|---|---|---|---|
| Blend Resin | | none | none | none | none | none | Vistamaxx ™ | Vistamaxx ™ |
| Blend Percentage | % | 0 | 0 | 0 | 0 | 0 | 5 | 10 |
| Extrusion Conditions | | | | | | | | |
| Screw | rpm | 75 | 75 | 75 | 75 | 75 | 75 | 75 |
| Stack roll speed | fpm | 90 | 90 | 93 | 95 | 92 | 85 | 85 |
| Melt Temperature | ° F. | 395 | 388 | 377 | 373 | 382 | 382 | 381 |
| Barrel Zone 1 temp. | ° F. | 350 | 348 | 350 | 351 | 350 | 350 | 350 |
| Barrel Zone 2 temp. | ° F. | 407 | 410 | 405 | 406 | 406 | 406 | 406 |
| Barrel Zone 3 temp. | ° F. | 415 | 419 | 415 | 415 | 414 | 415 | 415 |
| Adaptor temp. | ° F. | 425 | 415 | 387 | 390 | 393 | 397 | 397 |
| Die Zone 1 temp. | ° F. | 435 | 397 | 387 | 381 | 388 | 392 | 392 |
| S-wrap top roll temp. | ° F. | 105 | 105 | 105 | 105 | 105 | 105 | 105 |
| S-wrap bottom roll temp. | ° F. | 105 | 105 | 105 | 105 | 105 | 105 | 105 |
| Film thickness | mil | 1.2 | 1.2 | 1.2 | 1.2 | 1.2 | 1.2 | 1.2 | all comparative examples C1, C2, and C3. As the films are pre-stretch to 100% and 200%, the cling force of E1 and E2 still maintain above 200 grams-force per inch width which is significantly higher than all comparative examples C1, C2, and C3 without external cling agent.

TABLE 3

| Cling properties of cast film (Cling force, gm/in) | | | | |
|---|---|---|---|---|
|  | E1 | C3 | C4 | C5 |
| % Vistamaxx ™ | 0 | 0 | 5 | 10 |
| 0% pre-stretch | 236 | 28 | 184 | 302 |
| 100% pre-stretch | 211 | 25 | 135 | 195 |
| 200% pre-stretch | 225 | 11 | 98 | 119 |

As shown in Table 3, when an external cling agent such as Vistamaxx™ 6102 FL was applied to comparative sample C3, the cling force increases noticeably under 0% pre-stretch. But as the pre-stretch progresses, the cling force of Vistamaxx™ treated C3 (samples C4 and C5) gradually decreases. At about 200% pre-stretch, the cling force of both samples C4 and C5 dropped below 120 grams-force per inch width. The cling force of E1 of the present invention remains constantly above 200 grams-force per inch width over the same range of pre-stretch.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings therein. Furthermore, no limitations are intended to the details of construction or design herein shown, other than as described in the claims below. It is therefore evident that the particular illustrative embodiments disclosed above may be altered or modified and all such variations are considered within the scope and sprit of the present invention. Unless otherwise indicated, all numbers expressing quantities of ingredients, properties, reaction conditions, and so forth, used in the specification and claims are to be understood as approximations based on the desired properties sought to be obtained by the present invention, and the error of measurement, etc., and should at least be construed in light of the number of reported significant digits and by applying ordinary rounding techniques. Whenever a numerical range with a lower limit and an upper limit is disclosed, and number falling within the range is specifically disclose. Moreover, the indefinite articles "a" or "an", as use in the claims, are defined herein to mean one or more than one of the element that it introduces.

What is claimed is:

1. A multilayer cast film, comprising a skin layer and one or more core layers, wherein the skin layer and the one or more core layers comprises, a cast film component layer having an outstanding cling property and prepared from a Ziegler-Natta catalyzed ethylene and alpha-olefin copolymer having:
   a density between about 0.910 g/cc and about 0.930 g/cc;
   a melt index ratio ($I_{21}/I_2$) of between about 20 and about 35 dg/min;
   a melt index ($I_2$) of between about 0.5 and about 10 dg/min;
   a polydispersity index (Mw/Mn) of between about 3.0 and about 5.0; and
   at least 15% of Temperature Raising Elusion Fraction (TREF) fraction below an elution temperature of 35° C.;
   wherein the copolymer is produced by reacting ethylene and an alpha-olefin comonomer in the presence of a titanium-based Ziegler-Natta catalyst and an alkylaluminum co-catalyst at a temperature in the range of 50° C. to 100° C., an ethylene partial pressure of from 10 psi and 350 psi, and a comonomer to ethylene ratio of from 0.01 to 0.50;
   wherein the cast film component layer has a cling force of at least 200 grams-force per inch width at 200% pre-stretch and a slow puncture resistance of greater than 50 J/mm;
   wherein the cast film component layer does not include cling additive.

2. The multilayer cast film of claim 1, wherein the alpha-olefin comonomer is selected from the group consisting of 1-hexene, 1-octene and 1-butene.

3. The multilayer cast film of claim 1, wherein the titanium-based Ziegler-Natta catalyst comprises:
   a. magnesium;
   b. a compound having the formula $R^1{}_m Si(OR^2)_n$, wherein $R^1$ and $R^2$ are $C_1$-$C_{20}$ carbon atoms, m=0-3, n=1-4, and m+n=4, and wherein each $R^1$ and each $R^2$ may be the same or different;
   c. a compound having the formula $R^3{}_x SiX_y$, wherein $R^3$ is $C_1$-$C_{20}$ carbon atoms, X is halogen, x=0-3, y=1-4, and x+y=4, and wherein each X and each $R^3$ may be the same or different;
   d. a compound having the formula $MX_4$ and $M(OR^4)X_4$, wherein M is a titanium, wherein $R^4$ is $C_1$-$C_{20}$ carbon atoms, X is halogen, and wherein each $R^4$ may be the same or different;
   e. a substituted aromatic nitrogen compound; and
   f. an alkyl halide or aromatic halide compound having the formula $R^5X$, wherein $R^5$ is an alkyl group containing 3 to 20 carbon atoms or an aromatic group containing 6 to 18 carbon atoms, and X is selected from chlorine and bromine.

4. The multilayer cast film of claim 1, wherein the cast film component layer has a TD tear strength of greater than 450 g/mil.

5. The multilayer cast film of claim 1, wherein the alpha-olefin comonomer is selected from the group consisting of 1-hexene, 1-octene and 1-butene.

6. The multilayer cast film of claim 1, wherein the titanium-based Ziegler-Natta catalyst comprises:
   g. magnesium;
   h. a compound having the formula $R^1{}_m Si(OR^2)_n$, wherein $R^1$ and $R^2$ are $C_1$-$C_{20}$ carbon atoms, m=0-3, n=1-4, and m+n=4, and wherein each $R^1$ and each $R^2$ may be the same or different;
   i. a compound having the formula $R^3{}_x SiX_y$, wherein $R^3$ is $C_1$-$C_{20}$ carbon atoms, X is halogen, x=0-3, y=1-4, and x+y=4, and wherein each X and each $R^3$ may be the same or different;
   j. a compound having the formula $MX_4$ and $M(OR^4)X_4$, wherein M is a titanium, wherein $R^4$ is $C_1$-$C_{20}$ carbon atoms, X is halogen, and wherein each $R^4$ may be the same or different;
   k. a substituted aromatic nitrogen compound; and
   l. an alkyl halide or aromatic halide compound having the formula $R^5X$, wherein $R^5$ is an alkyl group containing 3 to 20 carbon atoms or an aromatic group containing 6 to 18 carbon atoms, and X is selected from chlorine and bromine.

* * * * *